Jan. 9, 1940.　　　　G. L. BRIGGS　　　　2,186,475
SKID CHAIN
Filed Feb. 25, 1938　　2 Sheets-Sheet 1
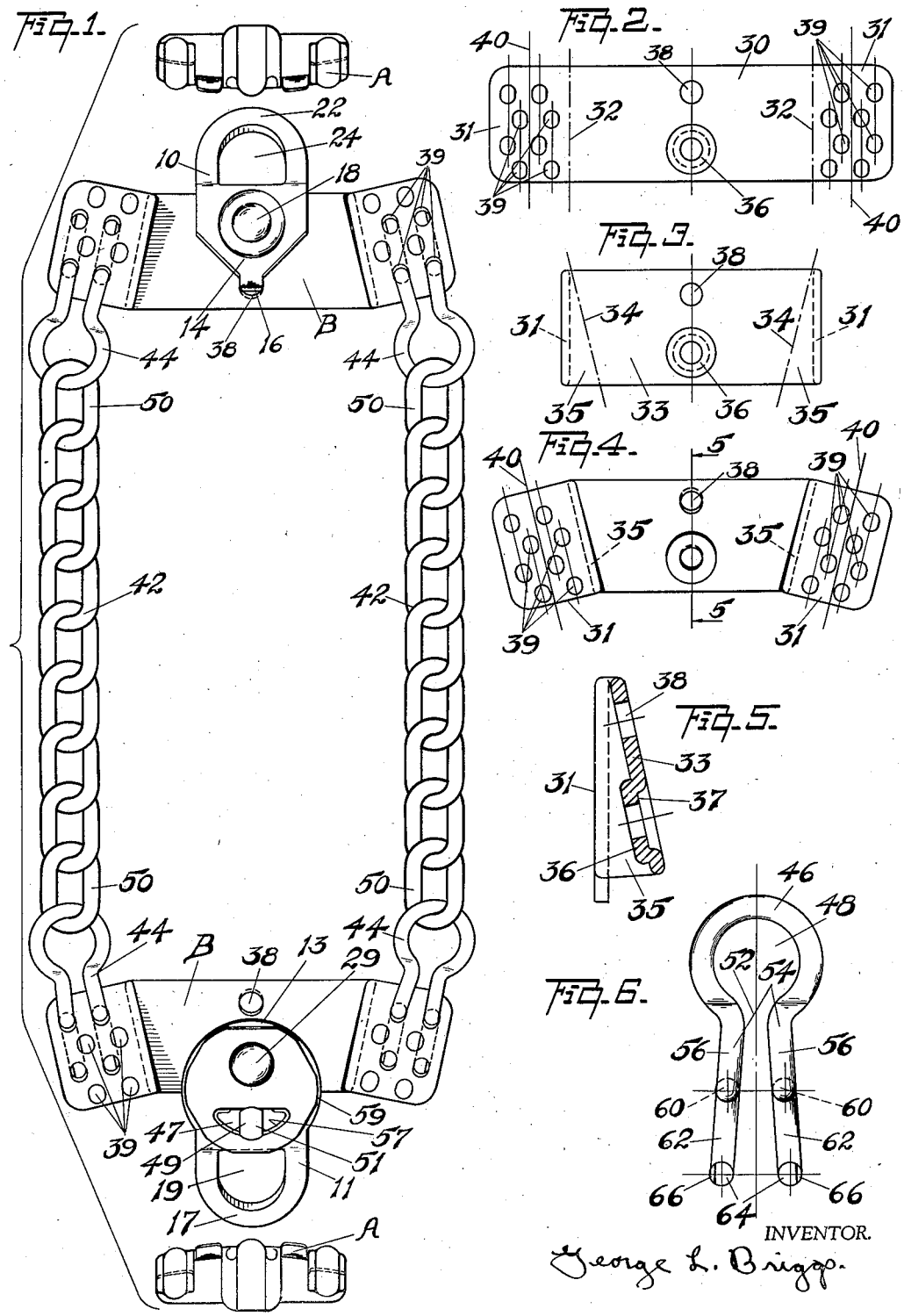
INVENTOR.
George L. Briggs.

Jan. 9, 1940.  G. L. BRIGGS  2,186,475
SKID CHAIN
Filed Feb. 25, 1938  2 Sheets-Sheet 2
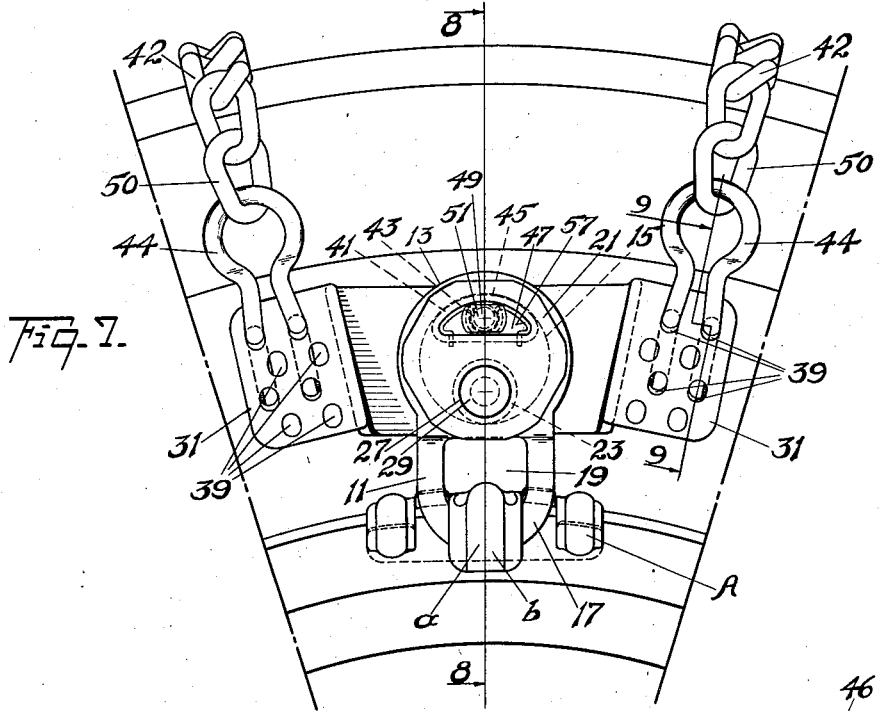
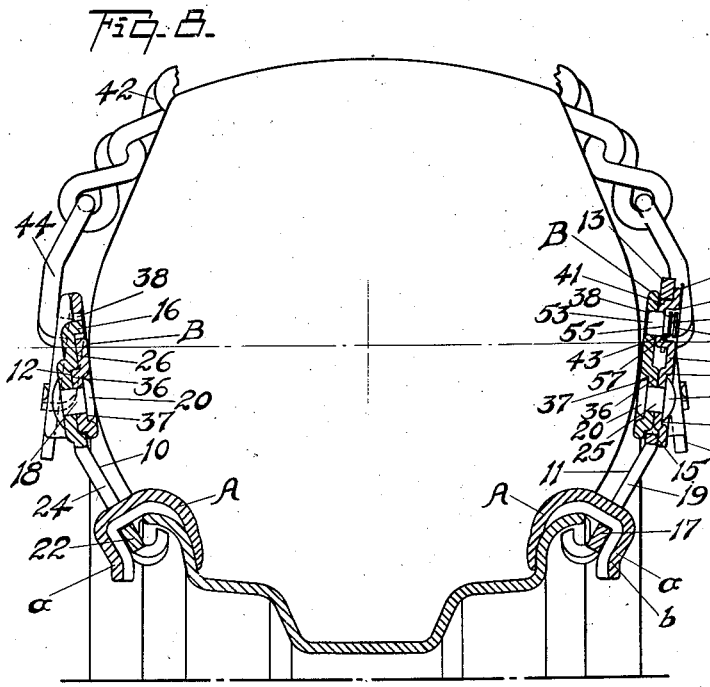
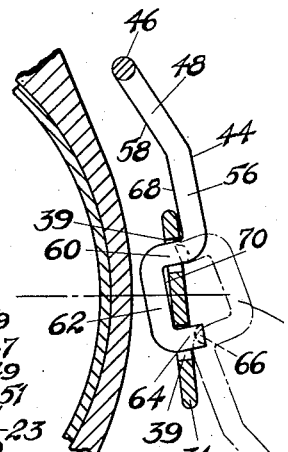
INVENTOR.
George L. Briggs.

Patented Jan. 9, 1940

2,186,475

UNITED STATES PATENT OFFICE 2,186,475

SKID CHAIN

George L. Briggs, Oneida, N. Y.

Application February 25, 1938, Serial No. 192,461

16 Claims. (Cl. 152—233)

This invention relates to improvements in skid chains for automotive vehicles having resilient, readily compressible tires, such as pneumatic tires of the straight side bead type.

The principal object of the invention is to provide a skid chain mechanism which can be readily attached to and detached from an automobile wheel having the usual standard straight side bead type rim without the usual necessity of extending the mechanism through the wheel; which can be adjusted to a plurality of predetermined fixed lengths; which is of such construction that the cross-chain members may be removed and replaced without the use of any tool; and which permits the side pressure-plates to be so formed as to conform generally with the tire, in both circumferential and transverse outline when mounted upon the tire, whereby a compact and very efficient arrangement is obtained.

With these general objects in view and others which will be obvious from the description hereinafter, the invention, broadly considered, comprises a pair of holding-members, such as hook-carrying members, located upon opposite sides of the wheel rim and in line with each other, as described and claimed in Patent No. 2,074,534, issued to me March 23, 1937; a pair of side pressure-plates, each carrying a connecting means for engagement with and to be held by the holding or hook-carrying members on the wheel rim, at least one of said connecting means being extensible and retractable with respect to its respective pressure-plate, and means carried by said pressure-plate to lock said connecting means in its retracted position, these pressure-plates being provided with a plurality of sets of predetermined spaced apertures at different points thereon, and a plurality of cross-chains, each carrying upon their respective ends adjustable chain-hooks, these chain-hooks being so formed that they are self-locking with the pressure-plates when connected thereto, but still can be readily engaged with or disengaged from the apertures in the pressure-plates without the use of any tool. In one embodiment of the invention, the apertures in the pressure-plates, to which the chains are connected by the chain-hooks, are so spaced that when the pressure-plates are placed upon the side of a tire, the companion sets of apertures formed in the same pressure-plate have different radial distances from the holding members carried by the wheel rim, and said sets of apertures will lie substantially upon outwardly diverging radians as when drawn through the axis of the wheel, whereby one size of the proper length of a cross-chain may be connected to the proper set of apertures to allow of the fitting of a skid mechanism to a plurality of different sizes of tires within a certain range of tires, and when so fitted will maintain at least one pressure-plate, carrying its respective extensible and retractable connecting means, in a predetermined position, upon the side of the tire, relative to its respective holding member carried on the wheel rim, and this position of said pressure-plate with respect to its holding member on the rim will be the same irrespective of the size of tire upon which the skid chain mechanism is fitted.

The best embodiment of the invention applicable to a standard rim having a drop center and carrying a tire of the straight side bead type will now be described in detail in connection with the accompanying drawings, in which Figure 1 is a plan view showing the cross-chains and pressure-plates with their respective connecting chain-hooks and stirrups;

Figure 2 is a plan view of a pressure-plate as drawn and pierced;

Figure 3 is a view showing the pressure-plate with wings formed down;

Figure 4 is a plan view showing the pressure-plate with central portion formed down bringing the wings up into the position as shown;

Figure 5 is a sectional view, enlarged, taken on the line 5—5 of Figure 4;

Figure 6 is a plan view of a chain-hook;

Figure 7 is a side elevation, broken away, showing a cross-chain mounted upon the tire;

Figure 8 is a cross-sectional view taken on the line 8—8 of Figure 7 showing the respective parts in relative relation, and Figure 9 is an enlarged sectional view, broken away, taken on the line 9—9 of Figure 7.

Referring to the drawings, A indicates hook-carrying members attached to the edges of the rim, in line with and opposite each other; of the type described in Patent No. 2,074,534, to which are connected side pressure-plates B, advantageously formed from sheet steel, the connection being made by stirrups 10, 11, which will be more fully described hereinafter. While the side pressure-plates may be formed in various ways, it is advantageous to so form them that one blank can be used for both sides of the tire, thereby making for a considerable economy in manufacture without detracting from any of the desired results in the operation of the mechanism. One advantageous manner of accomplishing the desired result will now be fully described, in connection with Figures 2, 3, 4, 5. A blank 30, Figure 2, having been drawn, pierced and sheared in a punch press in the usual well known manner from strip metal of a desired width, has its ends 31 formed downward at substantially right angles along a line indicated by the broken lines 32, Figure 2, as best shown in Figure 3, after which the central portion 33 is formed downward along a line indicated by the angular broken lines 34, Figure 3, thereby causing the angular portions 35, intermediate the central portion 33 and the ends 31, to stand up at substantially right angles to the plane of the surface of the central portion 33. In so forming the central portion 33, angular portion 35, carrying ends or wings 31, causes the plane of the surface of central portion 33 and the planes of the surfaces of the wings 31 to lie at converging angles, converging toward the upper edge, as best shown in Figures 5, 8, at the same time bringing the wings 31 into a position to conform approximately to the circumferential outline of the tire when mounted thereon, as shown in Figure 7. It will be seen that in forming a pressure-plate in this manner, the plane of each wing 31, when mounted upon a tire, extends in the direction of the pull exerted upon such wing; that the central portion 33 takes bearing upon and conforms generally to the transverse outline of the tire; that the plane of the surfaces of the central portions 33 extend in a direction toward their holding means located upon the edges of the rim, as shown in Figure 8, and that the turning moment upon the pressure-plates, caused by the pull of the chains, which must be resisted by the holding means A when the pressure-plates are connected thereto, is reduced to a minimum. It will be obvious from the above description that a pressure-plate, conforming generally both circumferentially and transversely with the outline of a tire and having a minimum of transverse depth when mounted, can be most economically manufactured from standard narrow strip metal, which plate needs no blanking operation such as would be required if an irregular shaped blank, with its unavoidable waste of scrap metal and greatly increased cost and upkeep of dies inherent therewith, were made so as to conform to the circumferential outline of a tire.

The blank 30, Figure 2, intermediate the ends, has formed upon the outer surface, as by drawing, a pierced boss 36, the outside periphery of this boss being substantially tangent to the central longitudinal axis of the blank, and upon the inner surface a recess 37 is formed concentrically within this boss; above this boss and substantially in line therewith, a coacting spaced aperture 38 is formed. The purpose of the boss 36 and aperture 38 will be explained hereinafter in connection with the stirrups attached thereto. Upon the ends 31, a plurality of spaced sets of elongated chain-hook apertures 39 are pierced, the vertical axes of any set of apertures being substantially at right angles to the longitudinal axis of the blank 30 and parallel to the common vertical axis 40 intermediate the respective companion sets, as best shown in Figure 2, the apertures in each set also being parallel to each other. While these companion sets of apertures may be pierced equidistant from and parallel to the common axis 40, it is advantageous to stagger the respective sets in a manner as shown. By so doing, the net section of metal as between the respective sets is increased, whereby it is possible to use a narrower width blank for a predetermined spacing of the companion sets in each end. This spacing may be of any desired distance, but as the transverse diameters of standard tires vary in size by quarter inches, such as 5.75, 6.00, 6.25, the difference in transverse length of any two consecutive sizes would be $Pi(D-D_1)=d$, in which D is the diameter of a tire and $D_1$ is the diameter of the next smaller size tire, and since the pressure-plate B, carrying the wings 31 within which the chain-hook apertures 39 are pierced, are arranged when mounted upon the tire to be held at a radius which falls but slightly below the horizontal center line of the tire and rim, as best shown in Figures 8-9, it is only necessary to consider one-half the transverse length of the tire for adjustment of the proper size cross-chains; therefore, it is advantageous to space the companion sets of apertures 39 in the wings 31 so that, when mounted upon the tire, the radial difference as between the respective companion sets will be in the order $$\frac{Pi(D-D_1)}{2}$$

It will be seen that in so spacing the apertures 39, one size of cross-chain and chain-hooks of the proper length to pass over the tread of the tire from one side to the other can be used for a number of different sizes of tires within a limited range, the example as shown being three in number; also, it will be seen that as a tire tread wears, as from attrition, by running upon the surface of the road, the chains can be adjusted, to compensate for this wear, to maintain a desired relation with the tire upon which they are mounted. It also will be obvious that an increasing number of sizes of tires could be encompassed with one size of cross-chain of a proper length, by merely increasing the radial width of the wings 31 and increasing the number of properly spaced apertures therein.

In forming the pressure-plates B as heretofore described, and in particular the central portion 33, it is advantageous that the central portion 33 be so formed downward (that is, away from the observer), on the angular broken lines 34, Figure 3, to bring up the wings 31 to assume a relative position, as shown in Figure 4, that the magnitudes of these converging angles are such as to cause the common axes 40, located upon the wings 31 of the pressure-plates B, to lie substantially upon and parallel to radians struck from the center of the wheel when the pressure-plates are mounted thereon. By so forming, the cross-chains connected to the wings across the tread of the tire will be caused to assume a position at right angles to the turning moment of the wheel, as best shown in Figure 7, whereby a greater peripheral length of tire intermediate the companion chains of each unit mechanism will be protected against skidding while maintaining comparatively shorter lengthwise pressure-plates; also, as it is advisable to use three sets of skid chain mechanisms upon a wheel, generally spaced 120° apart, a lesser peripheral length of tire intermediate each skid mechanism so mounted will be unprotected against skidding. It has been found in forming pressure-plates in this manner that the increased distance between companion chains make for easier and more enjoyable comfort in riding, when chains, of a necessity, have to be used, than when units are used which have relatively short distance between companion chains. It has also been found that the carcass of the tire walls, and in particular that portion adjacent the shoulders thereof, is less susceptible to internal injury from the chains if widely spaced as described, this result accruing from the fact that as a tire carrying a cross-chain contacts the road surface, the angle of curvature longitudinally of the tire with respect to the then coacting chain is considerably lengthened.

Upon the central portion 33 of the inner pressure plate a stirrup 10 is fixed, this stirrup 10 having formed upon its inner contacting surface 26 a pierced recess 12, this recess 12 being adapted to receive and take bearing upon a coacting pierced boss 36 formed upon the outer surface of the plate B. The inner end 14 of the stirrup is provided with a tang 16 formed inwardly and substantially at right angles to the plane of the contacting surface 26, this tang 16 being in spaced relation to the pierced recess 12, and adapted to take bearing within the aperture 38 pierced in the plate B when fixedly connected thereto, as by the rivet 18, the head 20 of which takes bearing within the recess 37 formed upon the inner bearing surface of the plate B, thus the tang 16 taking bearing within the aperture 38 prevents relative movement between the parts when connected together by the single rivet 18. The outer end 22, being provided with a hook engaging aperture 24, is formed inwardly of the plane of the contacting surface 26 at an angle, the plane of which lies substantially parallel to and at right angles with the hook and the hook-carrying members a, A, respectively when connected therewith, this angle also being such as to cause the outwardly converging angular surfaces of the pressure plate B, as viewed from the end, Figure 8, to lie in equal angular planes relative to the vertical plane of the side of the tire when mounted thereupon. It will be seen that in providing a connecting means of this type an economy in manufacture may be practiced in assembly of the parts, while at the same time providing a plurality of shearing surfaces as between the parts.

Whereas the pressure-plates B for both sides of the tire are identical in form and piercing, and the inner stirrup 10 is rigidly connected to its respective pressure plate, it is advantageous to connect the outer stirrup in an adjustable manner to its coacting pressure-plate, the purpose of and manner of doing this will now be fully described. A stirrup 11, upon its inner end 13, is provided with a punched bore 15, the outer end 17 being provided with a hook-engaging aperture 19 capacitated to receive the hook formed upon the hook-carrying member A, the plane of this aperture 19 converging angularly inward of the plane of the bore 15, this angle being similar to the angle heretofore described in forming the inner stirrup 10. There is also provided a locking disk 21, upon the inner surface of which is formed, as by drawing, concentric to the rotating axis of the disk, a pierced boss 23, the height of the inner face of this boss being such that, when mounted upon the outer face of the boss 36 formed upon the central portion 33 of the plate B and connected thereto, as by the rivet 25, the space intermediate the inner face of the disk 21 and the outer surface of the central portion 33 will allow of relative movement of the stirrup 11 mounted therebetween, the outside periphery of this boss 23 being substantially tangent to the axis of the disk. Upon the outside surface of the disk within this boss 23, a female recess 27 is formed, into which the outer head 29 of the rivet 25 takes bearing.

Above the boss 23 and diametrically opposite thereof, upon the inner surface of the disk 21, as best shown in Figures 7, 8, a segmental shoe 41 having a pierced aperture 43 is formed, the height of this circular segmental shoe being substantially equal to the transverse depth of the coacting stirrup 11; the radius of the outside contacting surface 45 of the shoe 41 being of a measure which is equal to the outside diameter of the boss 23, when measured along their common axis from the axis of the disk 21, the axis of the disk 21 being tangent to the outside periphery of the boss 23. In forming the shoe 41 and aperture 43, there is formed upon the outer surface of the disk 21, within the shoe, a segmental recess 47. Within this recess 47 and aperture 43, a locking pin 49 is adjustably mounted, this pin having an elongated scored head 51, a shank end 53 upon which, adjacent the head, a necked portion 55 is formed. Also fixedly mounted within the recess 47 is a resilient yoke-spring 57, so formed as to engage the necked portion 55 of the pin 49 and to retain the pin in an adjusted position within the recess 47 and the aperture 43. It is to be understood that the pierced boss 23 and the aperture 43 formed upon the locking-disk 21 are in the same spaced relation to each other as are the pierced boss 36 and the aperture 38 formed upon the pressure-plate B, whereby the said apertures will register with each other when the disk 21 is in its locked position and the pin 49 may enter the aperture 38.

While the locking-disk 21 upon its edge 59 may be of any desired outline, it is advantageous to form the edge in an angulated manner, as best shown in Figures 1, 7, having the outside diameter of the disk greater than the bore 15 punched in the stirrup 11 and less than the outside diameter of the end 13 of the stirrup 11. By so forming, the disk can be readily grasped, as by the hand, to rotate the disk, or a wrench of the proper size may be applied thereto to facilitate rotation. The disk 21, carrying the stirrup 11 and the pine 49, when connected to the central portion 33 by the rivet 25 can be rotated in either direction to bring their respective apertures 43, 38 into coincidence, at which time the elongated head 51 of the pin 49 can be turned parallel to the length of the recess 47. By so doing, the shank end 53 of the pin will be caused to enter and take bearing within the aperture 38 by the reaction of the yoke-spring 57 acting upon the pin, whereupon further relative rotation is prevented and the stirrup and pressure plate will be in locked relation. To disengage the relative parts, it is only necessary to withdraw the pin 49 and rotate the elongated head 51 thereof at right angles to the elongated recess 47, upon the edges of which the head can take bearing. By so doing, the shank end 53 will be disengaged from the aperture 38, while the pin will be held within the recess 47 by the yoke-spring 57, and the disk 21 carrying the stirrup 11 can then be freely rotated without interference from the pin. It will be seen that the elongated head of the locking-pin when in the locking position, as best shown in Figures 7, 8, takes refuge within the recess, with its outer surface below the plane of the outer surface of the disk, thus accidental withdrawal of the pin, thereby causing the unlocking of the disk carrying the stirrup and the probable disengagement of said stirrup from its retaining hook when mounted upon the wheel is prevented.

It will be seen in forming a locking disk as above described that a minimum bore 15 in the stirrup 11 will be required to encompass the shoe 41 and the boss 23 formed upon the disk 21, while, when the various parts are connected together, maximum relative movement as between the stirrup 11 and the pressure plate B can be obtained, the magnitude of this relative movement being so proportioned as to be equal to or greater than the inwardly extending tang b of the hook-carrying member A, attached to the outer side of the rim, to which the stirrup 11 can be connected in a manner hereinafter described.

The cross-chains 42, capacitated to extend over the tread of the tire from one side to the other thereof, carry upon their respective ends self-locking chain-hooks 44, these chain-hooks being so formed as to be readily inserted in or removed from the spaced elongated apertures 39 pierced in the wings 31 of the pressure-plates B, the chain-hook 44 being formed upon the inner end 46 with an open-sided eye 48, this eye being capacitated to receive a chain-link 50 of the cross-chain and because of the narrow opening into the eye is self-retaining thereupon when the chain-hook is disconnected from its respective wing. Integral with and extending from the eye 48, adjacent the open side 52 in the direction of the length of the chain-hook 44, a plurality of hook-shanks 54 are provided. The longitudinal axes of these shanks lie at diverging angles, with respect to longitudinal axis of the chain-hook, in the direction away from the end 46, as best shown in Figure 6. Also, the plane of the eye is formed angularly inward of the plane of the shank portions 56, as indicated at 68, Figures 8, 9. The shanks 54, intermediate their lengths, are formed inwardly substantially at right angles to the plane of the axes of the portions 56, as indicated at 60, Figure 9, thence downwardly in the direction of the length of the chain-hook and substantially at right angles to the axes of the portions 60, as indicated at 62, Figure 9, and finally outward substantially at right angles to the plane of the axes of the portions 62 and substantially parallel to the plane of the axes of the portions 60, as indicated at 64, as best shown in Figure 9. The end portions 64 part way their length are tapered upon their widthwise sides, as at 66, the purpose of which will be more fully described hereinafter. The transverse axes of the portions 60 and portions 64 are in transversely parallel spaced relation to each other longitudinally of the chain-hook corresponding to the spaced relation of the transversely parallel axes of any cooperating set of elongated apertures 39 pierced upon the parallel vertical axes of that respective set into which these portions take bearing, while the vertical axes of the portions 60, as formed, are in spaced relative relation to the parallel vertical axes of any pair of apertures in any set, the vertical axes of the portions 64 lie outside the parallel vertical axes of the other pair of apertures forming any set, as best shown in Figure 6. It is advantageous in forming the chain-hook 44 that the lengths of the portions 60 are such that the space, intermediate the plane of the inner surfaces of the portions 56, as indicated at 68, and the plane of the outer surfaces of the portions 62, as indicated at 70, is equal to or greater than the transverse thickness of the wing 31; and the lengths of the end portions 64, exclusive of the length of the tapered portions, are also equal to the transverse thickness of the wing. The overall distance between the tapers 66 formed upon the end portions 64, when transversely measured upon their extreme outer ends, is less than the overall width of any pair of apertures in any set of apertures, pierced in the wings, when measured transversely of the length of the elongated apertures.

The manner in which a chain-hook 44 is connected to or disconnected from a wing 31 will now be described. With the eye 48 of the chain-hook 44 lying in an outward direction away from the inner edge of the wing, when viewed as in Figure 1, or downward as shown in light broken lines in Figure 9, the tapered ends 64 are caused to enter from the outer surface of the wing the inner pair of apertures of a selected set of apertures 39, as by pressure exerted upon the ends by the hand. Thence, upon relative rotation as between the chain-hook and its respective wings, the portions 62 can be entered into the inner pair of apertures their entire length. When so entered and upon further relative rotation of the chain-hook with respect to its respective wing, the portions 60 will be caused to enter the inner apertures and the tapered ends 64 will be caused to enter the outer apertures of the selected set of apertures, the eye 48 then lying inwardly of the inner edge of the wing, as in Figure 1, or upwardly as shown in Figure 9. It will be seen in forming the chain-hooks as heretofore described, and causing the portions 60 and tapered end portions 64 to enter their respective coacting apertures in a selected set of apertures 39, that tension will be created in the portions 62, the tension thus created causing pressure between the outer transverse sides of the ends 64 and the outer walls of the outer pair of apertures of the selected set of apertures, and this pressure is of a magnitude sufficient to maintain the chain-hooks, mounted upon the cross-chains, and their respective coacting wings forming a part of the side pressure-plates in fixed relation even when not mounted upon the tire, yet removable when desired.

It will be obvious that to disconnect a chain-hook from its coacting wing it is only necessary to reverse the operation of connecting one, and that the chain-hooks as formed and connected provide a plurality of shearing surfaces between the shanks thereof and their respective coacting wings, while when mounted upon the tire, as shown in Figures 7, 8, the pull of the cross-chains upon the chain-hooks creates self-locking action between the chain-hooks and their respective wings and this action will be in direct proportion to the pull exerted. It will also be obvious, with the proper length of cross-chains carrying chain-hooks upon their respective ends and with pressure-plates formed and pierced as heretofore described, that a plurality of predetermined lengths of a skid chain mechanism can be obtained with one size of cross-chains, thereby adapting it to several sizes of tires.

To apply an adjustable skid chain mechanism having a predetermined length to a wheel having hook-carrying members mounted upon the opposite sides thereof, as described in Patent No. 2,074,534, it is only necessary to adjust the outer stirrup to its extreme outermost position, as shown in Figure 1, then grasp a pressure-plate in each hand, extend the hand holding the inner rigidly connected stirrup part way around the tire, at the rear or forward part of the wheel, and place the aperture of the inner stirrup upon the hook of the hook-carrying member mounted upon the inside of the wheel and while so doing, keeping the chains connecting the pressure-plates taut transversely over the tread of the tire. Having placed the aperture of the inner stirrup upon its respective hook, with the hand holding the outer pressure-plate, the chains are drawn transversely outward of the wheel. This will seat the inner stirrup within the inner hook, then with the hand holding the outer pressure-plate swing the outer plate radially inward of the wheel until said plate contacts the outer side wall of the tire, whereupon the aperture of the outer stirrup in its extended position will receive the hook of the hook-carrying member mounted upon the outside of the wheel and the outer plane of the aperture will lie within the plane of the inner surface of the hook. Then the hand that held the inner pressure-plate may now grasp the locking disk and rotate the same in either direction to bring the locking-pin into coincidence with its coacting aperture pierced in the pressure-plate. By so doing, the outer stirrup is retracted and thus caused to take bearing within the hook. While still holding the disk in this position, the hand that held the outer pressure-plate is free to grasp the elongated head of the locking-pin and rotate the head until the head lies parallel with the elongated recess formed in the disk, whereupon the pin will be caused to enter and take bearing within its coacting aperture by the reaction of the yoke-spring fixedly mounted within the elongated recess, thereby locking the mechanism upon the wheel. To remove a skid chain mechanism from the wheel, it is only necessary to withdraw the locking pin and rotate the elongated head at right angles to the elongated recess, upon the edges of which the head will take bearing; then the disk can be freely rotated to extend the stirrup inwardly of the wheel, which will permit the disengagement of the aperture from the hook.

What is claimed is:

1. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said connecting devices being movably mounted on its pressure-plate for bodily movement into and out of engagement with said holding member, means carried by said pressure-plate for locking said connecting means in at least one position, and skid chains arranged to span the tread of a tire from one pressure-plate to the other, said chains having their respective ends attached to the corresponding pressure-plates.

2. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said pressure-plates having mounted thereon an actuating means rotatable in the plane of said pressure-plate and arranged to project said connecting means in a plurality of radial positions relative to its respective pressure-plate, locking means carried by said pressure-plate for locking said actuating means in at least one position relative to said pressure-plate, and skid chains arranged to span the tread of a tire from one pressure-plate to the other, said chains having their respective ends attached to the corresponding pressure-plates.

3. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried on the rim, at least one of said connecting devices being mounted to and upon its respective pressure-plate with its longitudinal axis transverse to that of said pressure-plate, and arranged to be radially extensible and retractable therewith, means carried by said pressure-plate for locking said transversely mounted connecting means in a retracted position relative to its pressure-plate, and skid chains arranged to span the tread of a tire from one pressure-plate to the other, said chains having their respective ends attached to the corresponding pressure-plates.

4. A skid chain mechanism suitable for use with automobile wheels having drop center rims carrying compressible resilient tires and having holding members carried wholly by the rim, said skid chain mechanisms comprising a pair of pressure-plates, each arranged to make contact with a tire at a fixed radial distance thereon on opposite sides of the tire from each other, and each having attached to it a connecting device arranged to be engaged with the holding member carried by the rim, at least one of said connecting devices being movably mounted upon its pressure-plate to allow it a predetermined radial extension and retraction relative to said pressure-plates, locking means carried by said pressure-plate and arranged to lock said connecting device in its retracted position, a plurality of skid chains arranged to span the tread of a tire from one pressure-plate to the other, each chain carrying upon their respective ends attaching means, said attaching means being arranged to secure the respective chain ends to the respective pressure-plates at a plurality of predetermined transversely radial points thereon, whereby said skid chain mechanism is applicable to wheels carrying tires of various diameters.

5. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said pressure-plates having mounted thereupon a reciprocating connecting device arranged to be extended with relation to its pressure-plate for engagement with its respective holding member when being put in place on a wheel, and to be retracted with relation to its pressure-plate after such engagement to retain its pressure-plate in operative connection with said holding member, means carried by said pressure-plate for locking said reciprocatory connecting devices when in operative engagement with its holding member, and skid chains arranged to span the tread of a tire from one pressure-plate to the other, said chains having their respective ends attached to the corresponding pressure-plates.

6. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said connecting means comprising a stirrup mounted upon its respective pressure-plate and having relative movement therewith, an eccentrically mounted rotatable disk mounted upon said pressure-plate within said stirrup and arranged to project said stirrup into position for engaging its respective holding member when being put in place on a wheel, and to retract said stirrup to prevent its release from said holding member, means for locking said disk in its position where the stirrup is retracted, and skid chains arranged to cross the tread of a tire from one pressure-plate to the other, said chains having their respective ends attached to the corresponding pressure-plates.

7. A skid chain mechanism suitable for use with automobile wheels having drop center rims carrying compressible resilient tires and having holding members carried wholly by the rim, said skid chain mechanism comprising a pair of pressure-plates each arranged to make contact with a tire at a fixed radial distance thereon on opposite sides of the tire from each other and each having attached thereto a connecting stirrup device arranged to be engaged with the respective holding member carried by the rim, at least one of said connecting devices comprising a stirrup mounted upon its respective pressure-plate and movable relative thereto, an eccentrically mounted rotatable disk mounted upon said pressure-plate with said stirrup and arranged to project said stirrup into position for engaging its respective holding member when being put in place on a wheel, and to retract said stirrup to prevent its release from said holding member, a locking pin carried by said disk, said pin being arranged to interlock said disk and said pressure-plate in fixed relation when the stirrup is retracted, and skid chains arranged to cross the tread of a tire from one pressure-plate to the other, said chains having their respective ends attached to the corresponding pressure-plates.

8. A skid chain mechanism suitable for use with automobile wheels having drop center rims carrying compressible resilient tires and having holding members carried wholly by the rim, said skid chain mechanism comprising a pair of pressure-plates, each arranged to make contact with a tire on opposite sides of the tire from each other, a connecting device carried by each pressure-plate and arranged to engage the respective holding member carried by the rim, at least one of which is mounted upon its pressure-plate to permit bodily movement transversely thereto to permit it to be engaged with and disengaged from its respective holding member, means intermediate the connecting devices for lengthening and shortening the total length of the skid chain mechanism, said lengthening and shortening means comprising traction increasing means connected to the pressure-plates whereby the skid chain mechanism is capable of use with wheels having tires of different diameters within a predetermined range of diameters.

9. A skid chain mechanism suitable for use with automobile wheels having drop center rims carrying compressible resilient tires and having holding members carried wholly by the rim, said skid chain mechanism comprising a pair of pressure-plates, each arranged to make contact with a tire on opposite sides of the tire from each other, each pressure-plate having a plurality of apertures aligned transverse of its central longitudinal axis at different radial distances thereon, skid chains arranged to span the tread of a tire from one pressure-plate to the other, and securing means carried by each end of each chain and arranged to engage with different respective apertures to secure the chain end to its respective pressure-plate, and a connecting device carried by each pressure-plate and arranged to engage the respective holding member, at least one of which connecting devices is mounted upon its pressure-plate to permit bodily movement transversely thereto to permit it to be engaged with and disengaged from its respective holding member.

10. A skid chain mechanism suitable for use with automobile wheels having drop center rims carrying compressible resilient tires and having holding members carried wholly by the rim, said skid chain mechanism comprising a pair of pressure-plates, each arranged to make contact with a tire on opposite sides of the tire from each other and each having attached to it a connecting device arranged to be engaged with the respective holding member carried by the rim, at least one of said pressure-plates having a plurality of pairs of apertures, each pair being aligned transversely of the central longitudinal axis of said pressure-plate at different radial distance thereon, a plurality of skid chains arranged to span the tread of a tire from one pressure-plate to the other, and means for attaching the respective ends of the chains to the respective pressure-plates, said attaching means comprising chain hooks secured to the respective ends of the chains, each chain hook having a shank provided with a pair of connected transverse portions arranged to enter their respective apertures from the opposite surfaces of the pressure-plate to secure the respective chain end to the respective pressure-plate.

11. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said pressure-plates having a plurality of sets of apertures, the vertical axis of each set being transverse to the central longitudinal axis of said pressure-plate and the transverse axis of each adjacent set being at different radial distances thereon, a plurality of skid chains arranged to cross the tread of a tire from one pressure-plate to the other, and means for attaching the respective ends of the chains to the respective pressure-plates, said attaching means comprising chain hooks secured to the respective end of the chains, each chain hook having shanks provided with a plurality of connected transverse portions arranged to enter respective apertures in said pressure-plate from the opposite surfaces thereof to hold and lock the respective chain ends to the respective pressure-plates, whereby accidental disengagement of the chain ends from said pressure-plate is avoided.

12. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said pressure-plates having a plurality of sets of apertures, each set being aligned transversely of the central longitudinal axis of said pressure-plate, and each pair of apertures of each said set being aligned substantially at right angles to said transverse alignment and each adjacent set of apertures in said pressure-plate being at a different radial distance thereon, a plurality of skid chains arranged to cross the tread of a tire from one pressure-plate to the other, and means for attaching the respective ends of the chains to the respective pressure-plates, said attaching means comprising chain hooks secured to the respective ends of the chains, each chain hook having shanks provided with a plurality of connected transverse portions arranged to enter respective apertures of each pair in said pressure-plate from the opposite surfaces thereof to hold and lock the respective chain ends to the respective pressure-plate.

13. A skid chain mechanism suitable for use with automobile wheels having drop center rims carrying compressible resilient tires and having holding members carried wholly by the rim, said skid chain mechanism comprising a pair of pressure-plates, each arranged to make contact with a tire at a fixed radial distance thereon on opposite sides of the tire from each other and each having attached to it a connecting device arranged to be engaged with the respective holding member carried by the rim, at least one of said pressure-plates having a plurality of sets of apertures and each set comprising at least one pair of apertures, a plurality of skid chains arranged to cross the tread of a tire from one pressure-plate to the other, and means for attaching the respective ends of the chains to the respective pressure-plates, said attaching means comprising chain hooks secured to the respective ends of the chains, each chain hook having shanks provided with a plurality of connected transverse portions arranged to enter the respective apertures of said pair in said pressure-plate from the opposite surfaces thereof to hold and lock the respective chain ends to the respective pressure-plate, whereby accidental disengagement of the chain and from said pressure-plate is avoided.

14. A skid chain mechanism suitable for use with automobile wheels having drop center rims carrying compressible resilient tires and having holding members carried wholly by the rim, said skid chain mechanism comprising a pair of pressure-plates each arranged to make contact with a tire at a fixed radial distance thereon on opposite sides of the tire from each other and each having attached to it a connecting device arranged to be engaged with the holding member carried by the rim, at least one of said pressure-plates having a plurality of sets of apertures and each set comprising at least one pair of apertures, a plurality of skid chains arranged to cross the tread of a tire from one pressure-plate to the other, and means for attaching the respective ends of the chains to the respective pressure-plates, said attaching means comprising chain hooks secured to the respective ends of the chains, each chain hook having shanks provided with a plurality of connected transverse portions arranged to enter their respective apertures in said pressure-plate from the opposite surfaces thereof, at least one transverse pair of said transverse portions having a different transverse width than that of one of the coacting pair of apertures to hold and lock the respective chain and to the respective pressure-plate, whereby accidental disengagement of the chain from said pressure-plate when not applied to a wheel is avoided.

15. A skid chain mechanism suitable for use with automobile wheels having drop center rims carrying compressible resilient tires and having holding members carried wholly by the rim, said skid chain mechanism comprising a pair of pressure-plates, each arranged to make contact with a tire on opposite sides of the tire from each other, each pressure-plate having a central portion and two end portions, said end portions having flat surfaces lying in a common plane, the central portition having a flat surface lying in a plane at an angle to the plane of the surfaces of the end portions, a connecting device attached to said central portion and extending in the direction of the plane thereof and arranged to be engaged with the holding member carried by the rim, a plurality of chains arranged to span the tread of a tire from one pressure-plate to the other, and means for securing the respective ends of the chains to the respective end portions of the pressure-plates, said securing means extending in the direction of the plane of the end portions, whereby when the skid chain mechanism is in place on a wheel, the pull of a chain at the pressure-plates will be in the direction of the plane of the surfaces of the respective end portions to which it is attached, and the pull of the connecting device mounted on the central portion will be in the direction of the plane of said central portion, whereby transverse turning movement of said pressure-plate is avoided.

16. A skid chain mechanism suitable for use with automobile wheels having drop center rims carrying compressible resilient tires and having holding members carried wholly by the rim, said skid chain mechanism comprising a pair of pressure-plates, each arranged to make contact with a tire on opposite sides of the tire from each other, each pressure-plate having a central portion and two end portions, the plane of the surfaces of said end portions being different from the plane of the surface of said central portion, each pressure-plate also having two intermediate portions, each connecting its respective end portion to said central portion, the plane of the surfaces of said intermediate portions being transverse to the plane of the surfaces of said end portions and of said central portion and arranged to lie in a converging angle to the central transverse axis of said pressure-plate, said angle converging outwardly of said pressure-plate, a plurality of skid chains arranged to cross the tread of a tire from one pressure-plate to the other, said chains having their respective ends attached to the corresponding pressure-plates, and a connecting device attached to each pressure-plate and arranged to be engaged with the respective holding member carried by the rim.

GEORGE L. BRIGGS.

CERTIFICATE OF CORRECTION.

Patent No. 2,186,475. January 9, 1940.

GEORGE L. BRIGGS.

It is hereby certified that error appears in the printed specification of the above numbered patent requiring correction as follows: Page 3, second column, line 44, for "pine" read pin; page 4, first column, line 36, for the reference numeral "68" read 58; page 7, first column, line 73, claim 13, for the word "and" read end; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.